April 27, 1954 R. L. YAHNKE ET AL 2,677,002
OLEFIN POLYMERIZATION WITH ALUMINUM CHLORIDE-HYDROCARBON
COMPLEX CATALYST
Filed April 19, 1952

INVENTORS:
Robert L. Yahnke
Judd W. Healy
BY
ATTORNEY

Patented Apr. 27, 1954

2,677,002

UNITED STATES PATENT OFFICE

2,677,002

OLEFIN POLYMERIZATION WITH ALUMINUM CHLORIDE-HYDROCARBON COMPLEX CATALYST

Robert L. Yahnke, Munster, Ind., and Judd W. Healy, Alton, Ill., assignors to Standard Oil Company, Chicago, Ill., a corporation of Indiana Application April 19, 1952, Serial No. 283,168

6 Claims. (Cl. 260—683.15)

This invention relates to an improved method and means for polymerizing olefins with an aluminum chloride hydrocarbon complex catalyst and it pertains more particularly to an improved process for obtaining large yields of heavy polymer in the polymerization of mixed butylenes from a butane-butylene refinery stream. This is a continuation-in-part of our prior application Serial No. 212,917 filed February 27, 1951 (now abandoned).

It has long been known that normally gaseous olefins can be converted to viscous liquid polymers by means of solid aluminum chloride as such or by means of liquid aluminum chloride double compounds or complexes. Effective use of an aluminum chloride-hydrocarbon complex catalyst has been obtained by passing dispersed liquefied olefins upwardly through a cooled column thereof. An object of this invention is to provide a further improvement in the use of aluminum chloride-hydrocarbon complex in hydrocarbon conversion processes and particularly in processes for polymerizing normally gaseous olefins such as propylene, isobutylene, normal butenes, and mixtures thereof. A particular object of the invention is to increase the quantity and quality of polymers obtainable in a given polymerization reactor by means of liquid aluminum chloride-hydrocarbon complex catalyst. Other objects will become apparent as the detailed description of the invention proceeds.

Briefly, the invention employs a continuous liquid phase conversion system wherein liquid aluminum chloride-hydrocarbon complex catalyst is dispersed in a continuous liquid hydrocarbon reactant phase, the continuous reactant phase with suspended liquid catalyst is rapidly impelled against cooling surfaces to obtain a high heat transfer coefficient and thus maintain a substantially uniform temperature, the liquid catalyst is continuously separated from the hydrocarbon phase and the bulk of it is recycled and redispersed in the continuous liquid hydrocarbon reactant phase, only a minor amount of the separated complex being withdrawn and the recycled complex being continuously fortified by the addition of a slurry or suspension of aluminum chloride in finely divided form. Our invention is a modification and/or improvement of the invention described and claimed in copending application Serial No. 212,890 filed February 27, 1951, and the described method and means for addition of make-up aluminum chloride in a complex-free slurry of light polymer is more fully described and claimed in copending application Serial No. 212,966 filed February 27, 1951.

As applied to the polymerization of normal and isobutylenes in a petroleum refinery butane-butylene stream, a particular embodiment of the invention contemplates the introduction of said stream into a vertical reactor at a level adjacent but spaced from the bottom thereof, introducing liquid aluminum chloride-hydrocarbon complex catalyst at a level adjacent but spaced from the top of the reactor, stirring the hydrocarbon phase and suspended catalyst in the central portion of the reactor to impel it against peripheral cooling coils or tubes through which a refrigerant is circulated to maintain a temperature in the range of about 0° F. to about 80° F. and preferably about 10° F. to 30° F., maintaining sufficient pressure to insure liquid phase conditions, e. g. about 50–100 p. s. i. g., withdrawing settled complex as dispersed droplets in a hydrocarbon phase from a quiescent zone at the bottom of the reactor and effluent product from the top thereof, discarding a minor part of the withdrawn complex and recycling a major part of the withdrawn complex stream for introduction into the upper part of the reactor at a rate which is greater than the charging stock feed rate, but less than 10 times the charging stock feed rate and which is preferably upwards of 2.5 times, but less than 7.5 times, the rate of charging stock introduction and continuously fortifying recycled catalyst by incorporating therewith (either outside or inside of the reactor) the required amount of powdered aluminum chloride which in this case is usually about .5 to 1.5 pounds per 100 pounds of olefin in the charging stock.

We have discovered that by increasing the activity of the catalyst (using more make-up aluminum chloride than heretofore employed) and increasing the effective contact of the catalyst by recycling amounts of the stream of dispersed complex preferably greater than 2.5 times the volume of charging stock introduced, we can obtain greater yields of heavy polymer from given charging stock than has heretofore been deemed possible. We have found that the high recycle rate is important since this minimizes the amount of aluminum chloride consumed in the process. It has heretofore been believed that such catalyst complex could not be readily handled at temperatures in the range of 20° to 30° F. or lower; we have discovered that it can be readily recycled in our system by maintaining a low level of settled complex and charging it to the recycle pump before the droplets appreciably coalesce. The recycle of dispersed catalyst droplets in the hydrocarbon carrier causes further breaking up of droplets by the pumping and turbulence. A slight temperature rise of 5–30° F. may be caused by reaction in the recycle line. Furthermore, we have found that by effecting polymerization at about 25° F. and employing about 25% more make-up aluminum chloride, we can increase the yield of heavy polymer by as much as about 60% over that obtainable by polymerization at 65° F. with 0.35 weight per cent of aluminum chloride based on total charge of .55 weight per cent of aluminum chloride based on olefins charged. The term "heavy polymer" as employed herein means polymer having a viscosity greater than 500 seconds (Saybolt Universal) at 210° F., the S. S. U. viscosity of heavy polymer in the particular example hereinafter set forth being about 1000 seconds Saybolt Universal at 210° F. or 100 seconds Furol at 210° F. and being characterized by a flash point of at least 350° F.

The invention will be more clearly understood from the following detailed description of a specific example read in conjunction with the accompanying drawing which forms a part of this specification and which is a schematic flow diagram of our improved process.

While the invention is applicable to liquid phase polymerization of normally gaseous olefins, such as propylene, isobutylene, normal butylenes, and mixtures thereof, it is primarily directed to the polymerization of a butane-butylene mixture associated with butanes in so-called butane-butylene refinery stream. In this example, the charging stock is a petroleum refinery butane-butylene stream containing about 26 weight per cent isobutylene, about 37 weight per cent normal butylenes, and about 36 weight per cent butanes, such stocks usually containing a small amount of propane, propylene, pentanes, and/or pentenes.

About 900 barrels per stream day of the butane-butylene charging stock from source 10 is caustic washed in wash system 11 with about .74 gallon per minute of 15% aqueous NaOH. The wash solution is then dried by passage through calcium chloride driers in drying system 12. The dry charging stock is then cooled to a temperature of about 0° to 30° F. in one or more heat exchangers 13, the charging stock preferably being split at this time and one-third of it charged to each of three continuous reactors so that the charge rate to each reactor will be about 520 gallons per hour.

Each of these reactors 14 is a cylindrical vessel about 12½ feet high and 4½ feet inside diameter. Just above the narrowed bottom portion of the reactor vessel there is a baffle plate 15 provided with spaced openings, e. g. about eight 4 inch holes. The base of the reactor is provided with two outlet conduits. Conduit 16 communicates with the bottom of the reactor and serves to discharge coalesced complex from the system. Conduit 17 preferably extends upwardly into a quiescent zone between plate 15 and the bottom of the reactor and it serves as an inlet for pump 18 which recycles dispersed liquid catalyst complex droplets in a continuous hydrocarbon phase through line 19 to a point in the reactor which is adjacent but spaced from the top thereof. In this particular example, the dispersed catalyst complex stream is thus recycled at the rate of about 2000 gallons per hour while only about 1 to 20 gallons of complex per hour is discharged through conduit 16 (or from settler 23 hereinafter described). The dispersed complex stream in this case is a two-phase stream in which the volumetric ratio of dispersed complex to hydrocarbon carrier is in the range of about 1:1 to 1:20 and is preferably about 1:5 to 1:10.

At the upper part of the reactor, a doughnut baffle 20 is provided with a central opening to facilitate insertion of the stirrer or impeller. The quiescent zone between baffle 20 and the top closure plate 21 provides a settling space for returning any entrained catalyst droplets to the reactor so that substantially catalyst free hydrocarbon product effluent may be withdrawn through product discharge line 22. The product stream thus withdrawn from each reactor is passed through a settling zone 23 provided with vertical baffle 24 for removing any residual entrained catalyst complex, the latter being withdrawn through line 25. The product effluent is then passed by line 26 to mixer 27 wherein it is mixed with about 14 gallons per minute of aqueous caustic solution at about 150° F. from source 28. The mixture then passes to caustic settler 29 from which the caustic wash is withdrawn through line 30 and the caustic washed product stream is introduced by line 31 to filter tower 32 which may be a bed of sand, gravel, or preferably limestone (chat) for removing entrained aluminum compounds, particularly gelatinous aluminum hydroxide. The clear product stream then passes through heater 33 and is thence introduced into flash drum 34 which may operate at a pressure of about 100 p. s. i. g. and a top temperature of about 300° F., a bottom temperature of about 320° F. being maintained by heater 35. In the flash tower, unreacted C4 hydrocarbons, chiefly butanes, are taken overhead through line 36, condensed in cooler 37 and collected in receiver 38.

From the base of the flash tower, a mixture of light and heavy polymer passes by line 39 through heater 40 to stripping tower 41. Heater 40 raises the temperature of the polymer mixture to about 525° F. and care should be taken to avoid excessive temperature at this point, a conventional Dowtherm boiler usually being employed to supply heat exchange fluid in heater 40. It is also usually desirable to add 110 pound steam from line 40' in amounts sufficient to facilitate the desired extent of stripping.

The stripper preferably operates at about atmospheric or reduced pressure, the stripping being effected by 110 pound steam introduced by line 42, inert gas preferably being introduced by line 43 at a lower point to insure removal of steam from the heavy polymer stream which is withdrawn at about 475° F. from the base of the stripper through line 44 and cooled in cooler 45. From the three-reactor system, about 300 to 350 gallons per hour of heavy polymer is produced. The light polymer is taken overhead from the stripper by line 46 and passed through cooler 47 to receiver 48. Condensed water is withdrawn through line 49 and the net light polymer production through line 50 (about 110 to 150 gallons per hour for the three-reactor system).

About 90 to 180 gallons per hour of light polymer is recycled by line 51 to serve as a vehicle for introducing make-up aluminum chloride to the system. This recycled light polymer is dried in a calcium chloride drier 52 and then distributed into each of three mixers 53, each of which is connected by line 54 to its respective reactor 14 with an outlet in the reactor at substantially the same level as the outlet of complex recycle line 19. Aluminum chloride powder not larger than 20 mesh and preferably smaller than 40 mesh is discharged from bin 55 (which is preferably vibrated by vibrator 56) in amounts regulated by a screw feeder driven by motor 57 into the open topped mixer 53. Recycled and dried light polymer is introduced into mixer 53 in amounts controlled by pump 58, the mixer preferably being provided with a motor driven stirrer 59. Thus, approximately .1 to 1, in this case about .3, pound of aluminum chloride is dispersed and slurried in each gallon of recycled and dried light polymer and while the slurry remains turbulent, it is forced by pump 60 through line 54 into reactor 14. In this particular example, pump 60 is of the variable speed type which may deliver about .4 to one gallon per minute. Thus, about 30 to 60 gallons per hour of light polymer containing about 10 to 20 pounds per hour of slurried aluminum chloride powder is continuously introduced into each of the three reactors to supply make-up catalyst for fortifying the recycled catalyst complex. This make-up aluminum chloride is thus supplied at a rate of about 0.4 to 0.8 weight per cent based on total charging stock or about 0.6 to 1.2 weight per cent based on total olefins charged. We have found that smaller amounts of aluminum chloride employed in the manner and under the conditions described in this example produces a somewhat larger proportion of heavy polymer to light polymer, but fails to produce as much total conversion and as much total heavy polymer as we are able to produce in our defined operation. Amounts of aluminum chloride of about 2.0 weight per cent based on total olefins charged is undesirable and wasteful. Thus, the amount of make-up aluminum chloride should be held within the critically defined limits of about 0.6 to 1.2 weight per cent based on total olefins charged.

As heretofore stated, the stream of dispersed aluminum chloride-hydrocarbon complex catalyst is recycled from the base of the reactor to the upper portion thereof through line 19 at a rate of approximately 2000 gallons per hour. For effective catalyst usage and maximum conversion, this recycle rate should be at least about 1000 gallons per hour and it may be as high as 3000 to 4000 gallons per hour, the stream in all cases having about 5% to 50% of complex therein in the form of finely dispersed droplets and the complex in all cases being fortified with the defined amounts of make-up aluminum chloride.

The low temperatures are maintained in the reactor by circulating refrigerant through peripheral coils 61 in each reactor and effective heat transfer is attained by impelling the liquid phase hydrocarbon reactant suspended catalyst against these heat exchange surfaces by means of stirrer mechanism, which in this example consists of a motor driven shaft 62 carrying three discs 63 spaced about 2 feet apart on which radial impeller blades 64 are mounted about 45 degrees apart, each impeller blade being about 4 by 5 inches and their tip to tip distance on a diameter being about 20 inches. The impeller shaft is rotated at a rate of about 25 to 250, e. g. about 100 R. P. M. This stirrer mechanism serves the multiple function of obtaining a high heat transfer coefficient and simultaneously assuring intimate dispersion and contact of catalyst in the liquid hydrocarbon reactant phase. The aluminum chloride particles introduced as a slurry through line 54 quickly combine with the dispersed catalyst complex particles and thus fortify the complex in situ. If desired, the make-up catalyst slurry may be introduced by line 54a into complex recycle line 19 instead of being introduced directly into the reactor.

It should be noted that the make-up aluminum chloride slurry is a relatively non-viscous suspension of powdered aluminum chloride and it is prepared at ordinary temperatures in the absence of added HCl so that in the short time of less than 2 minutes before the slurry enters the reactor it does not complex with the light polymer in which it is slurried but on the contrary combines with the already formed complex to fortify it.

Since our objective is to increase the quantity and quality of polymers obtainable in a given polymerization reactor by means of liquid aluminum chloride-hydrocarbon complex catalyst in the type of conversion system hereinabove described, the effect of process variables and operating conditions should be clearly understood. The following discussion is applicable to the production of a polymer having a S. S. F. viscosity of about 100 at 210° F., an API gravity of about 29 and average molecular weight of about 780, a minimum flash point (open cup) of about 350° F. and a pour point of about 20° F.

With respect to olefin conversion, the percentage of feed butylenes converted to total polymers increases with increasing temperatures in the defined range and also with increase in make-up catalyst addition rates above a minimum of about .35 percent aluminum chloride based on feed. By recycling complex as a dispersion of very small droplets (i. e. non-coalesced) and employing a make-up catalyst addition rate of at least about .6 weight percent based on total olefins charged (i. e. greater than .4 weight percent based on total charge), remarkably high catalyst activity is attained. When coalesced complex is recycled as a single phase the catalyst activity thereof, expressed as heat of hydrolysis, is about 150 calories per gram, which indicates a relatively low activity; when the recycled catalyst stream contains only 10 volume percent of dispersed complex particles, this complex is more active as indicated by a heat of hydrolysis of about 230 calories per gram, and when the recycle stream contains only 5 volume percent of dispersed complex particles, said complex has an activity of 275 calories per gram. The higher activity in the two-phase recycle operation may be the result of shorter residence time of catalyst in the reactor because catalyst inventory in the reactor is much lower with this type of operation. Although coalesced complex recycle gives, roughly, the same amount of conversion per amount of catalyst as the two-phase recycle, the nature of the conversion is quite different, as will be shown in considering selectivity.

Selectivity, as used herein, is defined as the volume percent of the desired heavy polymer in the total polymer produced; selectivities below 100 percent indicate that light polymer must be stripped out of total polymer to obtain the heavy polymer of desired average molecular weight while selectivities above 100 percent indicate that light polymer must be added to total polymer to reduce its average molecular weight or viscosity to the desired value. The higher the conversion or the higher the reactor temperature, the lower is the selectivity. Catalyst addition rate, recycle rate, and agitator speed apparently have little or no effect on selectivity. The two-phase catalyst recycle (complex droplets dispersed in hydrocarbon) produces higher selectivities than can be obtained by recycle of a single-phase of coalesced complex at conversions below about 50 percent. Furthermore, the two-phase catalyst recycle leads to a different molecular weight distribution in the product polymer by actually producing less polymer having extremely high molecular weight than does recycle of a single-phase of coalesced complex.

The total yield of heavy polymer passes through a maximum with increasing olefin conversion and is favored by low reaction temperatures. At 45° F. where recycle of a single-phase (coalesced complex) is at a rate to give 40 percent olefin conversion, the heavy polymer is only 15 percent based on feed while at the same temperature and same percent olefin conversion with two-phase catalyst recycle, the heavy polymer yield is about 18 percent. At 25° F. with coalesced single-phase complex recycle, maximum heavy polymer yield is attainable with an olefin conversion of approximately 60 percent and such maximum heavy polymer yield is about 20 volume percent based on feed; with two-phase recycle of dispersed complex at 25° F. and with slightly less olefin conversion (about 50 percent), the total heavy polymer yield is about 25 volume percent based on feed. Still higher heavy polymer yields are obtainable at temperatures of 5° F. and olefin conversions of between 40 and 50 percent but at these temperatures no comparison can be made with the single-phase coalesced catalyst recycle because such catalyst cannot be effectively recycled at such low temperatures. Thus, because of its effect on selectivity, the use of a two-phase catalyst recycle markedly improves the yield of heavy polymer at low conversion. Under usual operating conditions the yield advantage of the two-phase recycle system for making the particular heavy polymer hereinabove described is about 2 to 3 volume percent.

The type of catalyst recycle also has an effect on flash points of the product polymer, the two-phase recycle (complex droplets dispersed in hydrocarbon) producing somewhat higher flash points than are produced by single-phase (coalesced complex). Thus, to obtain the described heavy polymer with a flash point not less than 350° F., a selectivity below 87 percent must be employed when a single-phase of coalesced complex is recycled but with the two-phase recycle system, selectivities of 105 percent may be used. The higher flash points obtained in the two-phase recycle operation are further evidence that this type of operation produces polymer having a different (narrower) molecular weight distribution than is attained with recycle of single-phase coalesced complex.

The two-phase catalyst recycle system results in a reactor effluent of higher viscosity than that obtained with recycle of single-phase coalesced complex. This, in turn, results in somewhat higher spent catalyst carryover which means that the spent catalyst withdrawn from the system will be more largely, if not entirely, withdrawn through line 25 of settler 24 instead of from line 16.

While our invention has thus been described in considerable detail with respect to a specific commercial polymerization operation, it should be understood that the recited example is given by way of illustration and that our invention is not limited thereto. The composition of the butane-butylene stream may be varied throughout a relatively wide range, although it is preferred that the mixed butylenes constitute about 20% to 80% of the total charge and that both isobutylene and normal butylene be present to the extent of at least about 10%. It is important in all cases that the hydrocarbon be in the continuous phase in the stirred portion of the reactor and in some cases it may be advantageous to recycle an aliquot portion of the total hydrocarbon reactor effluent with incoming charging stock. Alternative finishing and fractionation systems may be employed and it is desirable, for example, to introduce ammonia or ammonium hydroxide into the effluent product stream prior to portions of the system wherein corrosion might otherwise be encountered, e. g. prior to mixer 27, prior to heater 33, etc.

The recycle of light polymer as a carrier for make-up aluminum chloride increases the ratio of light polymer to heavy polymer which passes through heater 33 into flash tower 34, into heater 40 and to stripper 41; this serves the useful function of avoiding foaming difficulties which might otherwise be encountered in the flash tower and stripper.

The polymers produced by our invention are of outstanding utility in many industrial fields and certain of them are commercially marketed under the trade name "Indopol."

We claim:

1. The method of polymerizing olefins containing 3 to 5 carbon atoms per molecule with an aluminum chloride-hydrocarbon complex catalyst in a conversion zone containing heat exchange surfaces, which method comprises introducing a charging stock consisting essentially of said olefins and light paraffinic hydrocarbon diluent in liquid phase into a conversion zone, also introducing into said conversion zone a recycle stream of small droplets of aluminum chloride-hydrocarbon complex dispersed in hydrocarbons at a rate in the range of 1 to 10 times the rate of charging stock stream introduction, adding make-up aluminum chloride to the conversion zone at a rate in the range of .5 to 1.5 weight percent based on total olefins charged, maintaining the conversion zone at a temperature in the range of 0° F. to 80° F. by impelling a continuous hydrocarbon phase consisting of charging stock components and reaction products and containing suspended droplets of aluminum chloride-hydrocarbon complex against said heat exchange surfaces while cooling said surfaces with a refrigerant, settling complex droplets from the reaction mixture below the conversion zone to obtain a concentration of complex droplets in hydrocarbons in the range of about 5 to 50 volume percent, pumping said concentrated suspension of droplets to break them into small droplets and provide said recycle stream, recycling said stream for introduction to the reactor before appreciable coalescence of the complex particles occurs so that the recycled stream will consist chiefly of a hydrocarbon carrier liquid and recycled complex will be contained therein as small dispersed droplets, separating remaining catalyst material from the product stream and fractionating the catalyst-free product stream to obtain at least one light hydrocarbon fraction and a heavy polymer fraction.

2. The method of claim 1 wherein the conversion is effected at a temperature below 30° F., the recycle hydrocarbon stream containing dispersed complex droplets is recycled at a rate greater than 2.5 times the total feed charge rate and the amount of make-up aluminum chloride added to the system is greater than .6 weight percent aluminum chloride based on total olefins charged.

3. The method of claim 1 wherein the olefins charged consist essentially of a mixture of isobutylene and normal butene together with saturated butanes, the butanes being present in amounts of at least 20 percent but not greater than 80 percent and the isobutylene and normal butenes, respectively, each being present in amounts of at least 10 percent.

4. The method of obtaining large yields of a viscous butylene polymer having a Furol viscosity of at least 100 seconds at 210° F. and a flash point of at least about 350° F. from a butane-butylene charging stock consisting essentially of $C_4$ hydrocarbons and containing at least 20 percent butanes and at least 10 percent each of isobutylene and normal butenes, which method comprises introducing said charging stock into a conversion zone provided with heat exchange surfaces, also introducing into said conversion zone a recycled stream composed of a continuous hydrocarbon phase containing dispersed small droplets of aluminum chloride-hydrocarbon complex having a heat of hydrolysis of at least about 175 calories per gram and containing about 5 to 50 percent of complex based on total recycle stream, introducing solid make-up aluminum chloride for fortifying said complex at a rate of at least about .6 weight percent based on total olefins charged to the conversion zone, intimately mixing the introduced charging stock and catalyst in a conversion zone while maintaining the mixture at a temperature in the range of about 0 to 45° F. by impelling against said heat exchange surfaces said mixture consisting chiefly of hydrocarbons but containing dispersed catalyst droplets, settling droplets of catalyst complex from the reaction mixture below the conversion zone to form said recycle stream, pumping said recycle stream to break droplets therein into smaller droplets and recycling said stream while catalyst droplets remain suspended in the hydrocarbon phase for introduction into the conversion zone, removing remaining catalyst material from conversion products and fractionating said catalyst-free products to obtain said heavy polymer.

5. The method of producing high molecular weight butylene polymers from a butane-butylene refinery stream containing at least 10 percent of isobutylene and at least 10 percent of normal butenes, which method includes the steps of introducing aluminum chloride-hydrocarbon complex into a conversion zone for intimate admixture with charging stock at a temperature in the range of about 0 to 20° F. by settling droplets of aluminum chloride complex from a reaction mixture to obtain a stream consisting chiefly of a continuous hydrocarbon phase but containing at least about 5 volume percent of complex in the form of dispersed droplets, and pumping said stream prior to coalescence of said droplets through a recycle conduit for introduction into the conversion zone and also introducing into the conversion zone sufficient solid make-up aluminum chloride catalyst in the form of suspended powder to maintain the activity of the complex at least about 175 calories per gram by heat of hydrolysis.

6. In a polymerization process wherein a charging stock consisting essentially of $C_3$ to $C_5$ olefins diluted with $C_3$ to $C_5$ paraffins is introduced at a low level in a reactor provided with peripheral heat exchangers and a central impeller, a complex stream is recycled from the base of said reactor to a high level therein, make-up aluminum chloride is introduced into the reactor and a product stream is withdrawn from the top of the reactor, said charging stock and complex stream being introduced at a rate to provide a continuous hydrocarbon phase containing suspended droplets of aluminum chloride-hydrocarbon complex catalyst in the reactor and said impeller providing intimate admixture of said droplets with the continuous hydrocarbon phase while impelling the hydrocarbon phase against the heat exchange surfaces for efficient heat transfer to maintain the conversion temperature in the range of 0 to 45° F., the improved method of operation which comprises settling droplets of complex in hydrocarbons below the conversion zone to form a concentrated hydrocarbon suspension of complex droplets containing about 5 to 50 percent of complex pumping said suspension which forms said recycled complex stream, from the base of the reactor prior to agglomeration of settled catalyst complex particles therein so that the recycled complex stream will consist of two separate phases with the hydrocarbon phase being continuous and with the catalyst complex being dispersed therein in the form of small droplets.

References Cited in the file of this patent

UNITED STATES PATENTS

| Number | Name | Date |
| --- | --- | --- |
| 2,315,080 | Reid | Mar. 30, 1943 |
| 2,389,240 | Reid | Nov. 20, 1945 |
| 2,397,945 | Burney et al. | Apr. 9, 1946 |
| 2,407,873 | Evering et al. | Sept. 17, 1946 |